(12) United States Patent
Mizuno et al.

(10) Patent No.: US 10,230,931 B2
(45) Date of Patent: Mar. 12, 2019

(54) PROJECTION APPARATUS AND CONTROL METHOD THEREOF

(71) Applicant: CANON KABUSHIKI KAISHA, Tokyo (JP)

(72) Inventors: Ryosuke Mizuno, Tokyo (JP); Eisaku Tatsumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/889,574

(22) Filed: Feb. 6, 2018

(65) Prior Publication Data

US 2018/0249138 A1    Aug. 30, 2018

(30) Foreign Application Priority Data

Feb. 24, 2017  (JP) ................................. 2017-033726

(51) Int. Cl.
*H04N 9/31* (2006.01)
*G03B 21/00* (2006.01)

(52) U.S. Cl.
CPC ......... *H04N 9/3185* (2013.01); *H04N 9/3105* (2013.01); *G03B 21/006* (2013.01)

(58) Field of Classification Search
CPC ...... H04N 9/3185; H04N 9/3105; H04N 9/31; G03B 21/006
USPC ........... 348/744, 745, 747, 806, 807; 353/31
See application file for complete search history.

(56) References Cited

U.S. PATENT DOCUMENTS

| 5,644,653 | A | 7/1997 | Sunakawa et al. |
| 5,936,619 | A | 8/1999 | Nagasaki et al. |
| 6,310,662 | B1 | 10/2001 | Sunakawa et al. |
| 6,700,587 | B1 | 3/2004 | Hasegawa et al. |
| 7,227,521 | B2 | 6/2007 | Yamazaki et al. |
| 7,250,942 | B2 | 7/2007 | Mitsumura et al. |
| 7,889,168 | B2 | 2/2011 | Yamazaki et al. |
| 7,995,080 | B2 | 8/2011 | Abe et al. |
| 8,040,441 | B2 | 10/2011 | Nishida et al. |
| 8,330,856 | B2 | 12/2012 | Sakashita et al. |
| 9,538,125 | B2 | 1/2017 | Sakashita et al. |
| 2008/0136975 | A1 | 6/2008 | Nishida et al. |
| 2011/0025726 | A1 | 2/2011 | Tatsumi |
| 2011/0057964 | A1 | 3/2011 | Kanazawa et al. |
| 2011/0090264 | A1 | 4/2011 | Tatsumi |
| 2013/0329193 | A1 | 12/2013 | Tatsumi |
| 2016/0037145 | A1* | 2/2016 | Tsukagoshi .......... H04N 9/3185 348/745 |
| 2017/0339381 | A1* | 11/2017 | Kojima .................... G06T 5/003 |

FOREIGN PATENT DOCUMENTS

JP    2008-147725 A    6/2008

* cited by examiner

*Primary Examiner* — Sherrie Hsia

(74) *Attorney, Agent, or Firm* — Venable LLP

(57) ABSTRACT

To reduce pixel position deviations in a plurality of color component images projected by a projection unit, a projection apparatus obtains, concerning the plurality of color component images projected onto the projection surface, position information concerning a projection position of each of remaining color component images with reference to a projection position of one color component image, and performs image processing for at least one of the plurality of color component images based on the obtained position information.

8 Claims, 8 Drawing Sheets

PROJECTION APPARATUS AND CONTROL METHOD THEREOF

BACKGROUND OF THE INVENTION

Field of the Invention

The present invention relates to a technique of reducing pixel position deviations in a plurality of color component images projected by a projection unit.

Description of the Related Art

Conventionally, an image projection apparatus has been put to practical use in a conference, a presentation, or the like. Such an image projection apparatus generally includes three liquid crystal display devices that form images corresponding to three, R, G, and B color components, and composites the R, G, and B color component image light beams modulated by the liquid crystal display devices, and projects the composite image onto a projection plane (projection surface), thereby displaying a full color image.

When the color component light beams modulated by the liquid crystal display devices are composited, if a deviation (so-called pixel position deviation) exists at the display position of each image, a bleeding caused by a color shift in an edge (outline) is visually perceivable. The pixel position deviation is caused by the chromatic aberration of a lens, a mounting error of a liquid crystal display device at the time of assembling of the image projection apparatus, or the like. It is therefore necessary to accurately adjust the relative positions of the liquid crystal display devices and fix them.

As a method of adjusting the pixel position deviation, there is a method of adjusting the position of an image formed on each liquid crystal display device. Japanese Patent Laid-Open No. 2008-147725 (patent literature 1) proposes a method in which a pixel position deviation amount is calculated for each pixel of at least one color component, and interpolation calculation processing is performed for the pixel based on the calculated pixel position deviation amount, thereby adjusting the pixel position deviation of each color component.

However, when the interpolation calculation processing described in patent literature 1 described above is performed, the pixel position deviation is improved, but a change in color/tint caused by the interpolation calculation processing may be visually perceivable. In addition, the degree of influence of image degradation caused by the disclination of each liquid crystal display device changes depending on the potential difference between adjacent pixels. For this reason, the degree of influence changes between a color component image that has undergone the interpolation calculation processing and a color component image that has not, and image quality degradation such as a change in color/tint may occur.

SUMMARY OF THE INVENTION

The present invention provides a technique that enables more suitable projection in which a pixel position deviation is reduced.

According to one aspect of the present invention, a projection apparatus comprises: a projection unit configured to project a plurality of color component images based on an input image onto a projection surface; an obtaining unit configured to obtain, concerning the plurality of color component images projected onto the projection surface, position information concerning a projection position of each of remaining color component images with reference to a projection position of one color component image; and an image processing unit configured to perform image processing for at least one of the plurality of color component images based on the position information obtained by the obtaining unit.

According to another aspect of the present invention, a projection apparatus comprises: a projection unit configured to project a plurality of color component images based on an input image onto a projection surface; an obtaining unit configured to obtain position information concerning a projection position of each of the plurality of color component images projected onto the projection surface with respect to a predetermined position on the projection surface; and an image processing unit configured to perform image processing for at least one of the plurality of color component images based on the position information obtained by the obtaining unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail with reference to the accompanying drawings. Note that the following embodiments are merely examples, and the technical scope of the present invention is not limited by the following embodiments.

First Embodiment

As the first embodiment of a projection apparatus according to the present invention, a projection apparatus that displays a full color image by projecting three, R (Red), G (Green), and B (Blue) color component images based on an input image will be described below as an example. In the first embodiment, particularly, a form in which based on the position information concerning a projection position of each of R and B color component images with reference to a projection position of G color component image, image processing (deformation processing and filter processing) is performed for the remaining color component images will be described.

<Arrangement of Apparatus>

Figure 1:
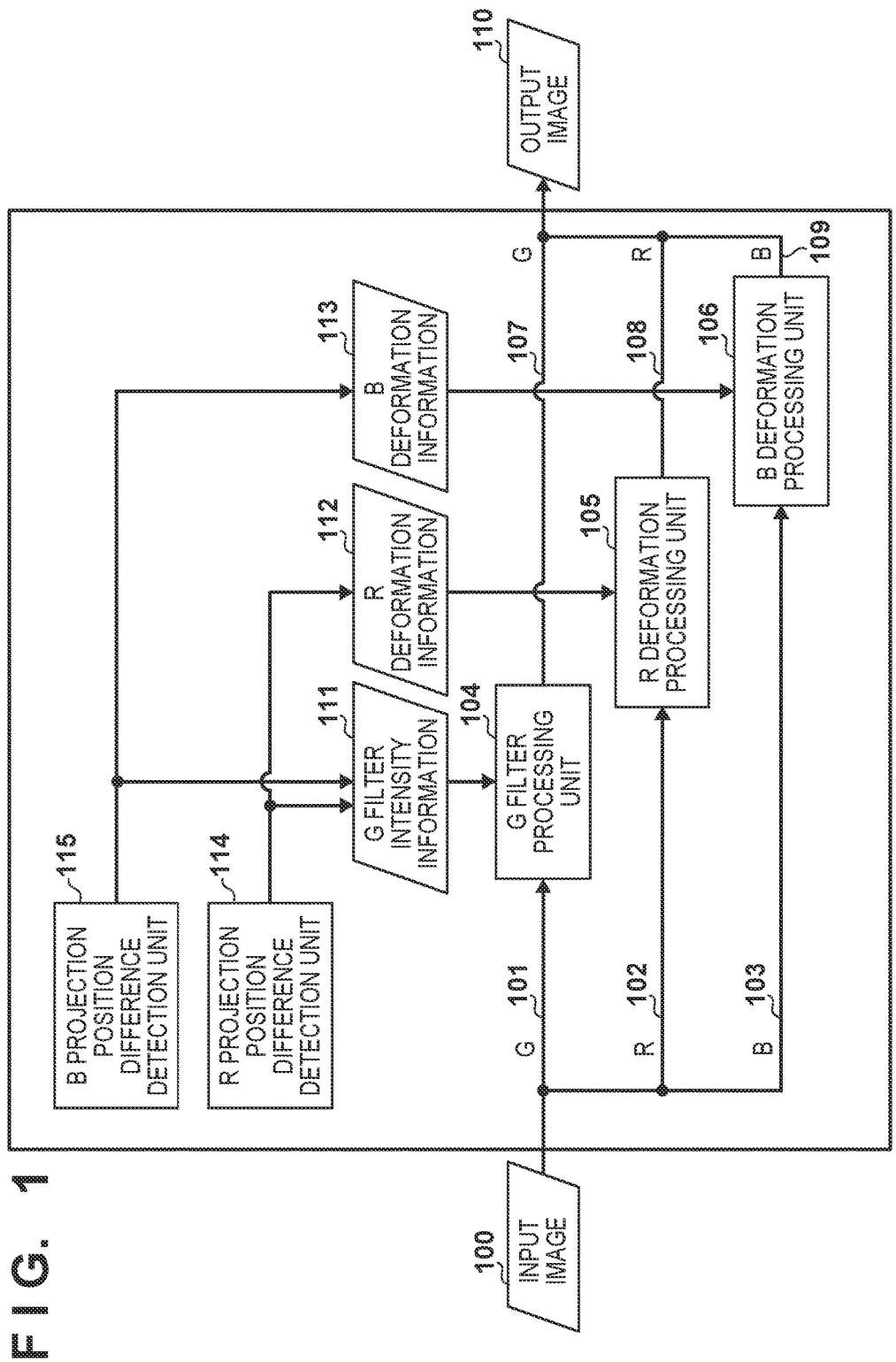
FIG. 1 is a block diagram showing the arrangement of a projection apparatus according to the first embodiment.

FIG. 1 is a block diagram showing the arrangement of the projection apparatus according to the first embodiment.

An input image 100 is an image formed from three, R, G, and B color components. A G input image 101 formed from the G color component is input to a G filter processing unit 104, and filter processing is performed for the spatial frequency component of the image. An R input image 102 formed from the R color component is input to an R deformation processing unit 105, and a B input image 103 formed from the B color component is input to a B deformation processing unit 106. Deformation processing is performed for these images.

An output image 110 is formed by a G image 107 after the filter processing, an R image 108 after the deformation processing, and a B image 109 after the deformation processing. The image projection apparatus includes three liquid crystal display devices (not shown) to form the R, G, and B images, modulates the output image 110 by the liquid crystal display devices, composites R, G, and B color light beams, and projects the image on a projection plane by a projection unit.

Note that for the descriptive convenience, the input image 100, the color component images (R, G, and B images), and the output image 110 (image display device) are assumed to have the same resolution in the following explanation.

Note that in the following description, assume that the three, R, G, and B color components each converted into a luminance level are processed. However, the color components may directly be processed without converting the input signal levels. Not the three, R, G, and B color components but other color components such as four, R, G, B, and Y components, four components including the R, G, and B color components and infrared light, or R, G, B, and Y components and infrared light may be used.

<Deformation Processing>

Deformation processing in the R deformation processing unit 105 and the B deformation processing unit 106 will be described using the R image as an example. The purpose of deformation processing is adjustment of a pixel position deviation. The pixel position deviation is caused by the chromatic aberration of a lens, a mounting error of a liquid crystal display device at the time of assembling of the image projection apparatus, or the like. Deviations occur between the images of color components that should be projected at the same coordinate position. Adjustment of the pixel position deviation means changing the image of each color component such that the deviations almost match.

An R projection position difference detection unit 114 detects a pixel position deviation amount. First, a reference image (G image) formed from the G color component and an image (R image) that is an adjustment target are projected onto the projection plane. The degree (the pixel position deviation amount or position information) of a deviation between the coordinate positions of G and R pixels that should be projected at the same coordinate position of the projection plane is detected. Here, assume that the user visually examines the projected images and decides the pixel position deviation amount, and the R projection position difference detection unit 114 accepts a user input of the pixel position deviation amount.

Here, a deviation amount in each of the horizontal direction and the vertical direction is detected. Let $(-\delta x)$ be the pixel position deviation amount in the horizontal direction, and $(-\delta y)$ be the pixel position deviation amount in the vertical direction (the unit of $\delta x$ and $\delta y$ is a pixel). For example, a deviation of "one pixel" in the input image 100 is "1.0". Each of $\delta x$ and $\delta y$ is preferably detected at an accuracy less than 1 pixel. For this reason, the pixel position deviation amount is detected here up to at least the first decimal place.

Based on the detected pixel position deviation amounts, the R projection position difference detection unit 114 decides R deformation information 112 that is a deviation parameter. Here, the R deformation information 112 is the reciprocal of the pixel position deviation amount. For a target pixel whose pixel position deviation is to be adjusted, the relationship between coordinates (xi, yi) of the R input image 102 input to the R deformation processing unit 105 and coordinates (xo, yo) of the R image 108 output from the R deformation processing unit 105 after deformation processing can be represented by $$xo = xi + \delta x$$

$$yo = yi + \delta y$$

Based on the above-described coordinate information, the R deformation processing unit 105 selects, for each pixel, pixel values corresponding to a plurality of coordinates in the neighborhood from the R input image 102, and calculates a weighted average. The pixel values of the R image 108 after the deformation processing are thus calculated. For example, the coordinates (xi, yi) are coordinates including decimal fractions. A pixel group corresponding to the integer coordinates of 2×2=4 points surrounding the coordinates (xi, yi) is selected from the R input image 102. Interpolation calculation is performed based on the group of the four selected pixels and the decimal coordinates of the coordinates (xi, yi), and the R image 108 after the deformation processing corresponding to the coordinates (xo, yo) is calculated. As the interpolation calculation method, an arbitrary interpolation calculation represented by bilinear interpolation or bicubic interpolation can be used.

In the above description, the R projection position difference detection unit 114 is assumed to accept the input of the pixel position deviation amount from the user. However, the apparatus itself may be configured to detect the pixel position deviation amount. For example, the projected images may be captured by a capturing apparatus (not shown), and the R projection position difference detection unit 114 may detect the pixel position deviation amount based on the captured images. In this case, the capturing apparatus (not shown) captures the G image and the R image projected on the projection plane and transmits the captured images to the R projection position difference detection unit 114. The R projection position difference detection unit 114 detects the pixel position deviation amount based on the capturing results.

Processing (processing of calculating the R image 108 after deformation processing) in the R projection position difference detection unit 114 and the R deformation processing unit 105 is preferably performed for all pixels. Note that the apparatus is preferably configured to detect the pixel position deviation amount for each of a plurality of representative points on the R image 108 after the deformation processing and perform deformation processing for all pixels based on the pixel position deviation amounts for the plurality of representative points.

Figure 2:
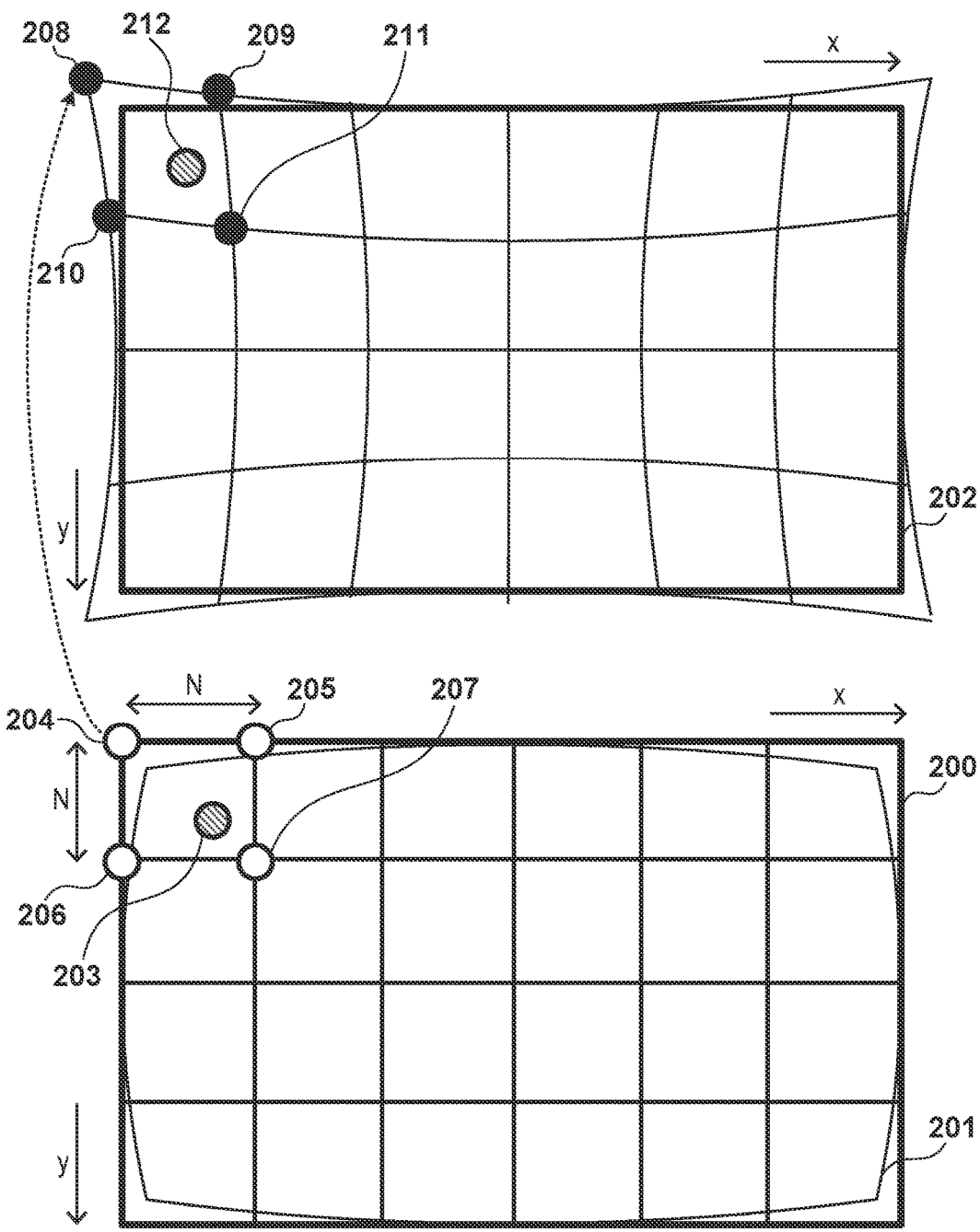
FIG. 2 is a view for explaining pixel position deviation adjustment by deformation processing.

FIG. 2 is a view for explaining pixel position deviation adjustment by deformation processing. An example in which a pixel position deviation amount is calculated using, as representative points, lattice points obtained by dividing the entire image after deformation processing into 6×4 (horizontal×vertical) parts, and deformation processing is performed will be described here.

Reference numeral 202 represents the shape of an input image; 200, an image shape in a case in which the input image does not undergo deformation processing; and 201, an image shape after the input image undergoes deformation processing. Reference numeral 203 denotes a pixel of interest after deformation processing; and 212, an input pixel corresponding to the pixel 203 of interest.

A method of calculating the coordinates of the input pixel 212 corresponding to the pixel 203 of interest using four representative points (reference numerals 204, 205, 206, and 207) surrounding the pixel 203 of interest will be described below. Let (xo, yo) be the coordinates of the pixel 203 of interest, and (xi, yi) be the coordinates of the input pixel 212. The representative points are arranged at equal interval coordinates in the image after deformation processing. For example, the representative point 204 and the representative point 205 are arranged in the horizontal direction at an interval of N pixels. N can be an arbitrary value of 1 pixel or more. The interval is preferably a power of 2 such as 4, 8, 16, 32, or 64. If the coordinates of the representative point 204 are (xo0, yo0), the coordinates of the representative points are as follows.

Coordinates of representative point 204: (xo0, yo0)

Coordinates of representative point 205: (xo1, yo1)=(xo0+N, yo0)

Coordinates of representative point 206: (xo2, yo2)=(xo0, yo0+N)

Coordinates of representative point 207: (xo3, yo3)=(xo0+N, yo0+N)

In addition, horizontal relative position α and a vertical relative position β of the coordinates (xo, yo) of the pixel 203 of interest at the four representative points are calculated by $$\alpha = (xo - xo0)$$

$$\beta = (yo - yo0)$$

On the other hand, the R projection position difference detection unit 114 detects the pixel position deviation amounts of only the representative points and obtains the R deformation information 112. The coordinates of each representative point in the input image are decided by the R deformation information 112. In FIG. 2, the coordinates of the representative points in the input image are represented by 208, 209, 210, and 211 as follows.

Reference numeral 208: coordinates (xi0, yi0) in input image corresponding to representative point 204

Reference numeral 209: coordinates (xi1, yi1) in input image corresponding to representative point 205

Reference numeral 210: coordinates (xi2, yi2) in input image corresponding to representative point 206

Reference numeral 211: coordinates (xi3, yi3) in input image corresponding to representative point 207

Next, the coordinates (xi, yi) of the input pixel 212 corresponding to the pixel 203 of interest are calculated by the following equations. An example using bilinear interpolation is shown here.

$$xit = xi0 + \alpha^*(xi1 - xi0)$$

$$xib = xi2 + \alpha^*(xi3 - xi2)$$

$$xi = xit + \beta^*(xib - xit)$$

$$yit = yi0 + \alpha^*(yi1 - yi0)$$

$$yib = yi2 + \alpha^*(yi3 - yi2)$$

$$yi = yit + \beta^*(yib - yit)$$

Deformation processing is performed as described above based on the calculated coordinates (xi, yi) of the input pixel 212. In the above-described way, after the pixel position deviation amount is detected for each representative point, pieces of deformation information (the coordinates of the input image) of all pixels are calculated, and deformation processing is performed.

Pixel position deviation amount detection and deformation processing for the R image have been described above. The B image is processed in the same way. A B projection position difference detection unit 115 detects the pixel position deviation amount, and B deformation information 113 corresponding to the coordinates of interest in the B image 109 after deformation processing is decided based on the pixel position deviation amount. A pixel group is selected from the B input image 103 based on the B deformation information 113, and the pixel values of the B image 109 after the deformation processing are calculated by interpolation calculation.

<Filter Processing>

Filter processing of the G filter processing unit 104 will be described using the R image as an example. A description will be made here assuming that smoothing processing is performed by applying a 3-tap low-pass filter (LPF). However, this filter does not particularly define a function. The LPF here performs filter calculation using a predetermined constant, thereby cutting off (filtering) an upper limit spatial frequency and generating a spatial low frequency component image. In addition, the filter is configured to process three vertical pixels and then process three horizontal pixels.

The G filter processing unit 104 is configured to be able to change the filter intensity for a predetermined pixel position (coordinates) of the G image. The G filter processing unit 104 also performs filter processing for pixels in the G image corresponding to pixels in the remaining color component images (the R image and the B image) for which pixel position deviation adjustment by an amount less than one pixel is performed. On the other hand, the G filter processing unit 104 decides a filter coefficient so the filter processing is not performed for pixels in the G image corresponding to pixels in the remaining color component images for which pixel position deviation adjustment by an amount less than one pixel is not performed. This makes it possible to limit the range of an image blur caused by filter processing.

Here, whether the pixel position deviation adjustment by an amount less than one pixel is performed or not is determined using the pixel position deviation amounts in the R and B images. On the other hand, a pixel in the G image for which filter processing is performed in accordance with the pixel position deviation amount is a pixel on which the R and B images after the pixel position deviation adjustment are superimposed on the projection plane. In the pixel position deviation adjustment, the centers of gravity of the R, G, and B input images are adjusted such that their coordinate positions match on the projection plane. Hence, in the pixel position deviation adjustment, it is determined whether the pixel position deviation adjustment is performed for each pixel based on each coordinate of the input image.

In the G input image 101, let Gyi[t−1], Gyi[t], and Gyi[t+1] be three pixels that continue in the vertical direction. Then, a pixel Gyo[t] of interest after vertical filter processing is calculated by $$Gyo[t]=Gyi[t-1]*Ct+Gyi[t]*Cv+Gyi[t+1]*Cb \quad (1)$$

where Ct, Cv, and Cb are filter coefficients, and (Ct+Cv+Cb)=1.0.

In the image after the vertical filter processing, let Gxi[t−1], Gxi[t], and Gxi[t+1] be three pixels that continue in the horizontal direction. Then, a pixel Gxo[t] of interest in the G image 107 is calculated by $$Gxo[t]=Gxi[t-1]*Cl+Gxi[t]*Ch+Gxi[t+1]*Cr \quad (2)$$

where Cl, Ch, and Cr are filter coefficients, and (Cl+Ch+Cr)=1.0.

A filter coefficient calculation method will be described next. First, G filter intensity information 111 is decided based on the pixel position deviation amounts from the R projection position difference detection unit 114 and the B projection position difference detection unit 115. For the descriptive convenience, assume here that the pixel position deviation occurs only in the R image, and the pixel position deviation amount is zero (absent) in the B image.

In the vertical pixel position deviation amount (−δy) in the R image, let δdy be the absolute value of the decimal fraction. Then, $0.0 \leq \delta dy < 1.0$. At this time, the vertical filter coefficients are calculated by $$Ct=\delta dy/M$$

$$Cv=1.0-(\delta dy/M)*2$$

$$Cb=\delta dy/M$$

where M is preferably set within the range of 2 to 16. Note that Ct and Cb are the same value but may be different values according to δdy. In addition, although the filter coefficient is preferably calculated for each pixel, the filter coefficient may be calculated for each region including a plurality of pixels.

The vertical filter coefficients have been described above as an example. Even in the horizontal direction, the horizontal filter coefficients are calculated in accordance with the same procedure as in the vertical direction based on the pixel position deviation amount (−δx) in the horizontal direction. Additionally, in the above explanation, the pixel position deviation amount in the B image is zero (absent). If a pixel position deviation occurs in the B image, it is effective to calculate filter coefficients from each of the R and G images and use mean squares thereof. Alternatively, a larger one of values δdy/M may be applied.

An example of the filter coefficient calculation method has been described above. Any method is usable if it can change the filter intensity. For example, the filter coefficient may be fixed, and images with or without filter processing may be composited by calculating a weighted average in accordance with a predetermined coefficient.

Figure 3:
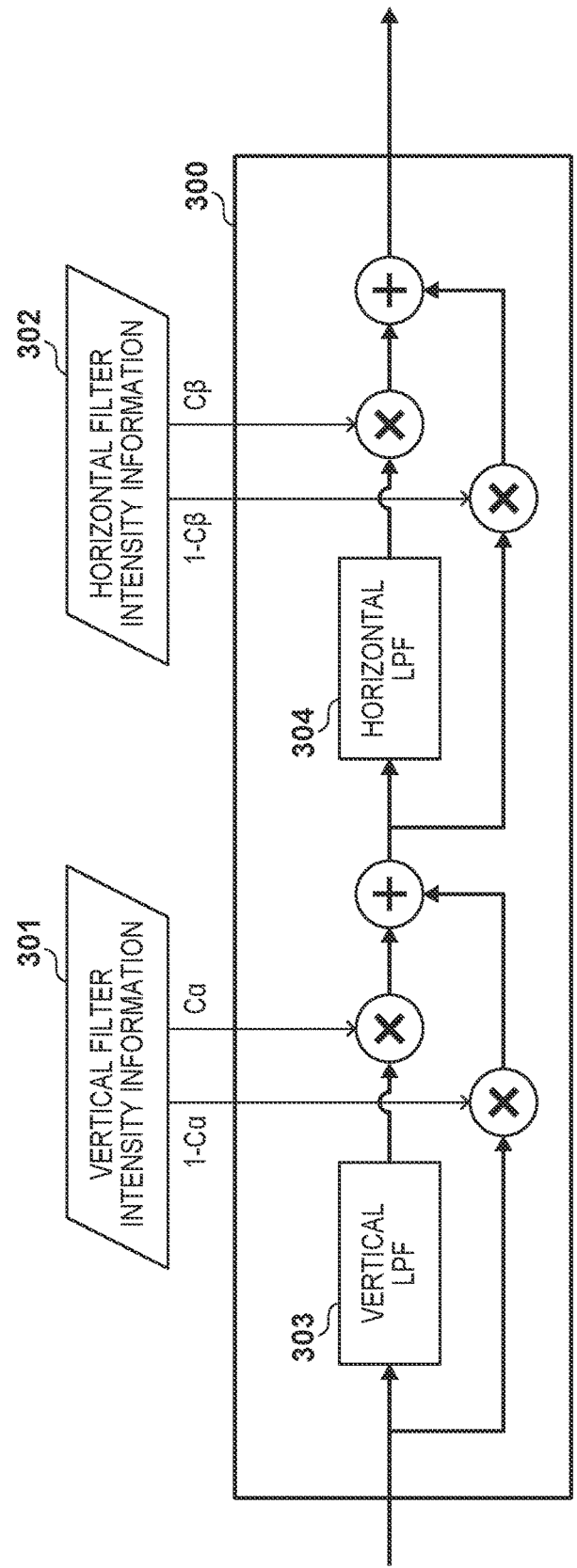
FIG. 3 is a view showing the arrangement of filter processing.

FIG. 3 is a view showing the arrangement of filter processing. A filter processing unit 300 includes a 3-tap low-pass filter (LPF) in each of the vertical direction and the horizontal direction. Filter processing in the vertical direction will be described first.

A vertical LPF 303 is a 3-tap LPF and is based on equation (1). The filter coefficients Ct, Cv, and Cb are preferably approximately Ct=0.2, Cv=0.6, and Cb=0.2. Based on the pixel position deviation amount, a multiplication coefficient Cα is decided in vertical filter intensity information 301. Here, Cα=δdy. At this time, filter processing in the vertical direction is performed based on an equation below. Note that the output result of the vertical LPF 303 is represented by VLPF( ).

$$Gyo[t]=VLPF(Gyi[t])*C\alpha+Gyi[t]*(1-C\alpha)$$

The filter processing result Gyo[t] in the vertical direction is thus calculated. Next, filter processing in the horizontal direction is performed using the calculation result.

A horizontal LPF 304 is a 3-tap LPF and is based on equation (2). The filter coefficients Cl, Ch, and Cr are preferably approximately Ct=0.2, Cv=0.6, and Cb=0.2. Based on the pixel position deviation amount, a multiplication coefficient Cβ is decided in horizontal filter intensity information 302. Here, Cβ=δdx. At this time, filter processing in the horizontal direction is performed based on an equation below. Note that the output result of the horizontal LPF 304 is represented by HLPF( ).

$$Gxo[t]=HLPF(Gyo[t])*C\beta+Gyo[t]*(1-C\beta)$$

The filter processing result Gxo[t] is thus calculated. An example of the arrangement of a filter capable of implementing a variable filter intensity has been described above. Note that the order of processes in the vertical direction and the horizontal direction may be reversed, or the processes may be performed at once using a two-dimensional spatial filter with 3×3 taps. The number of taps of each filter is not limited to three, and may be arbitrary. In addition, each filter does not particularly define a function.

<Pixel Position Deviation Compensation by Deformation Processing and Filter Processing>

Figure 4:
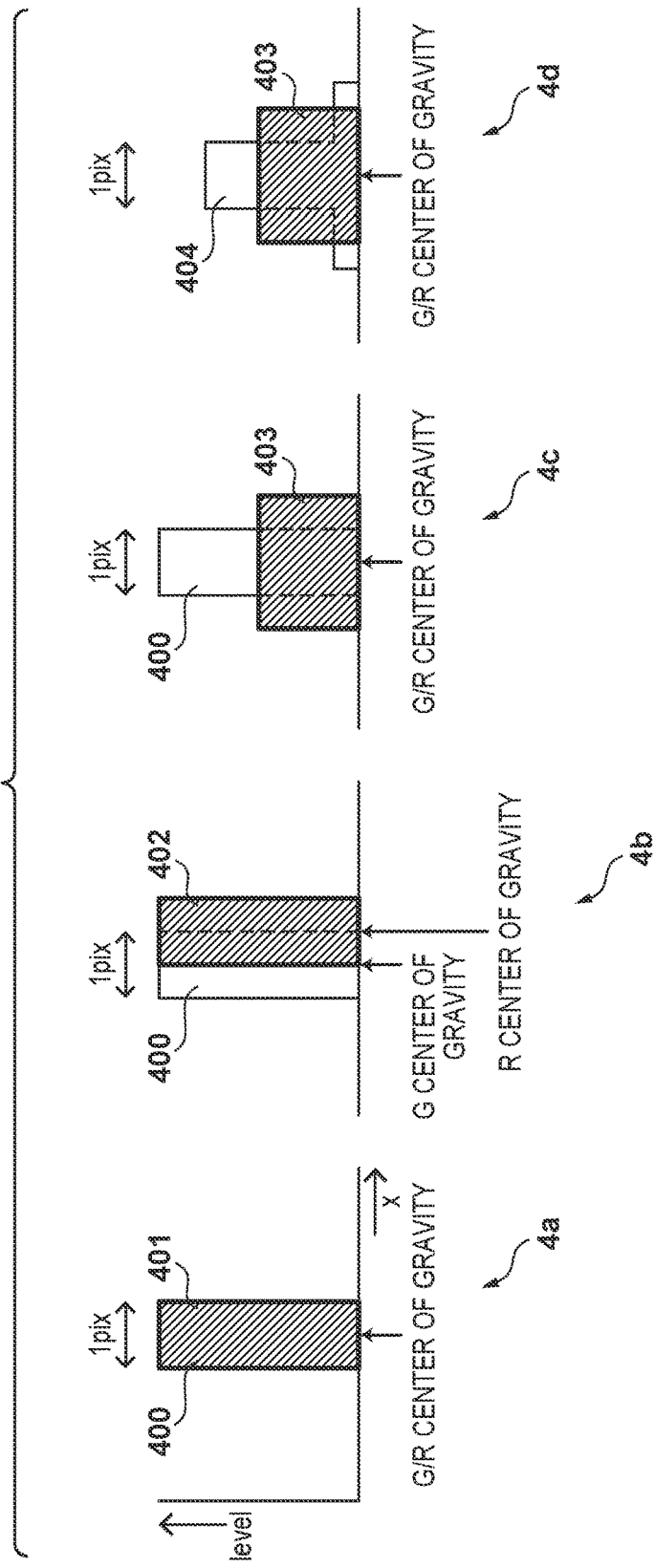
FIG. 4 is a view for exemplarily explaining an operation of compensating for a pixel position deviation.

FIG. 4 is a view for exemplarily explaining an operation of compensating for a pixel position deviation. Note that for the descriptive convenience, each graph of FIG. 4 shows only the R and G components. In FIG. 4, the abscissa represents the horizontal pixel position. In graphs 4a and 4b, each of the R and G components has a width of one pixel. The ordinate represents the luminance level of each color component image.

The graph 4a shows a position and a luminance level in a case in which a pixel position deviation does not occur. A G component (reference numeral 400) and an R component (reference numeral 401) have the same luminance level, and the centers of gravity in the horizontal direction match. On the other hand, the graph 4b shows a position and a luminance level in a case in which an R component (reference numeral 402) has a deviation of 0.5 pixel with respect to the G component (reference numeral 400).

A graph 4c exemplarily shows a result obtained by performing deformation processing (pixel position deviation adjustment) for the graph 4b. More specifically, a result obtained by performing interpolation calculation processing for the R component (reference numeral 402) using peripheral pixels is represented by reference numeral 403. As can be seen, the centers of gravity of the projection positions of the R and G components match, and the pixel position deviation is improved. On the other hand, the integrated luminance levels including the peripheral pixels match between the G and R components. However, the balance of the luminance levels of the G and R components is locally lost near the center of gravity of the projection position, as is apparent.

A graph 4d exemplarily shows a result obtained by further performing filter processing for the G component (reference numeral 400) in the graph 4c. The center of gravity of the projection position is the same as in the graph 4c. On the other hand, it is found that the balance of the luminance levels of the G and R components is improved.

Additionally, in each of the graphs 4a and 4b, the luminance level differences from adjacent pixels are the same in the R and G components. That is, the degrees of influence of disclination can be considered to be almost the same in the G and R components. On the other hand, in the graph 4c, the luminance level difference of the R component (reference numeral 403) is about ½ the luminance level difference of the G component (reference numeral 400), and the numbers of influenced pixels are different, as can be seen. That is, the degree of influence of disclination changes between the G component and the R component.

On the other hand, in the graph 4d, the luminance level difference from an adjacent pixel is smaller in a G component (reference numeral 404) than in the G component (reference numeral 400) shown in the graph 4c. That is, the degree of influence of disclination is close to the degree of influence in the R component (reference numeral 403).

<Operation of Apparatus>

Figure 5:
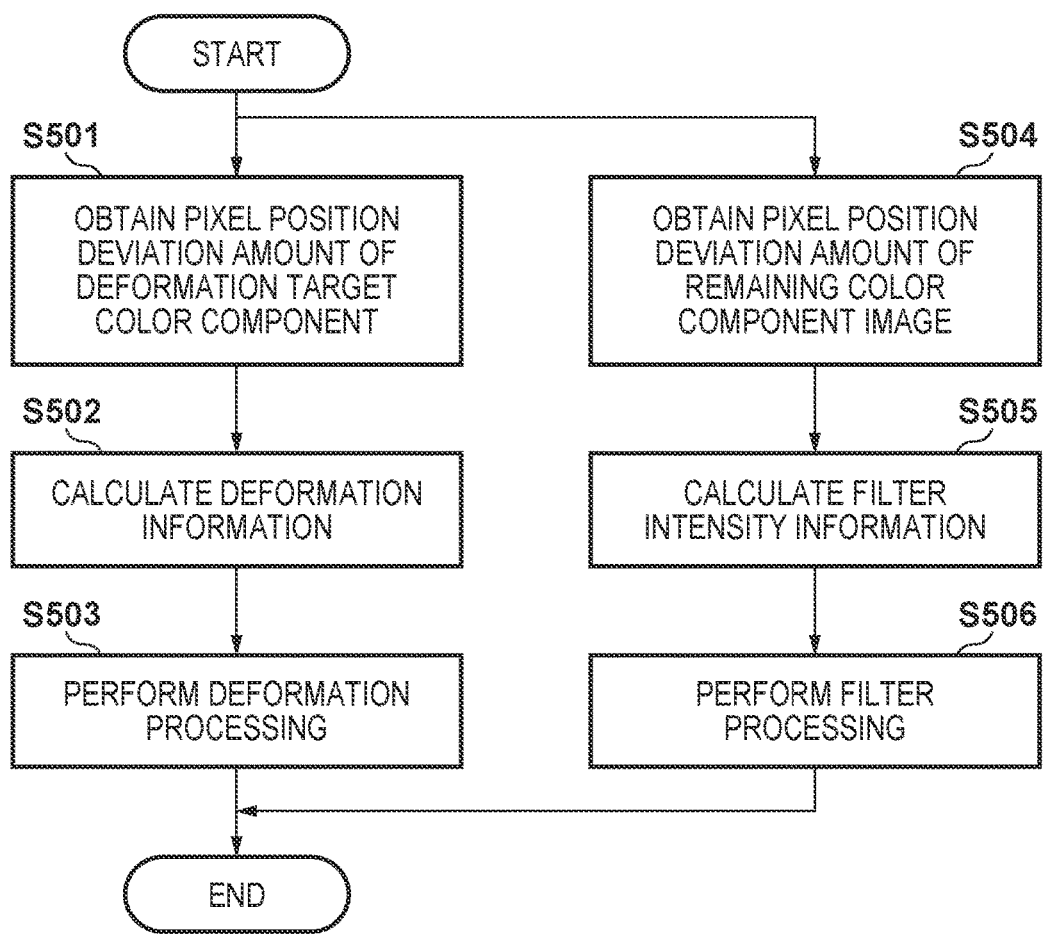
FIG. 5 is a flowchart showing the operation of the projection apparatus according to the first embodiment.

FIG. 5 is a flowchart showing the operation of the projection apparatus according to the first embodiment. Assume a situation in which an image formed from three, R, G, and B color components is projected onto a projection plane, as described above. In addition, control for adjusting a pixel position deviation by deforming the R and B images using the G image as a reference image will be described.

In step S501, the R projection position difference detection unit 114 and the B projection position difference detection unit 115 obtain the pixel position deviation amounts of the color component images (the R image and the B image) as the deformation targets with respect to the reference image (G image), respectively.

In step S502, the R deformation processing unit 105 and the B deformation processing unit 106 respectively calculate R and B deformation information based on the obtained pixel position deviation amounts. That is, pieces of deformation information that make the projection positions match that of the G image are calculated. In step S503, the R deformation processing unit 105 and the B deformation processing unit 106 perform deformation processing of the R image and the B image, respectively, based on the calculated deformation information.

In step S504, the G filter processing unit 104 obtains at least one of the pixel position deviation amounts of the deformation target color component images (the R image and the B image). In step S505, the G filter processing unit 104 calculates filter intensity information to be used in filter processing for the G image based on the obtained pixel position deviation amount. In step S506, the G filter processing unit 104 performs filter processing for the G image based on the calculated filter intensity information.

The output image 110 (projected image) is generated based on the thus generated color component images after the processing.

As described above, according to the first embodiment, the pixel position deviations of remaining color component images (the R image and the B image) with respect to the color component image (G image) serving as the reference are detected. For the remaining color component images, pixel position deviation adjustment by image deformation processing is performed. For the color component image serving as the reference, smoothing processing using a filter is performed. This makes it possible to simultaneously implement reduction of the pixel position deviation and suppressing of the change in color/tint. In particular, the change in color/tint can suitably be suppressed by changing the filter intensity in accordance with the degree of pixel position deviation adjustment of the remaining color component images.

Second Embodiment

In the second embodiment, a case in which each color component has a filter processing unit and a deformation processing unit will be described. That is, in the first embodiment, only smoothing processing is performed for the G image, and only deformation processing is performed for the R image and the B image. However, the apparatus may be configured to perform at least one of smoothing processing and deformation processing for each color component image.

<Arrangement of Apparatus>

Figure 6:
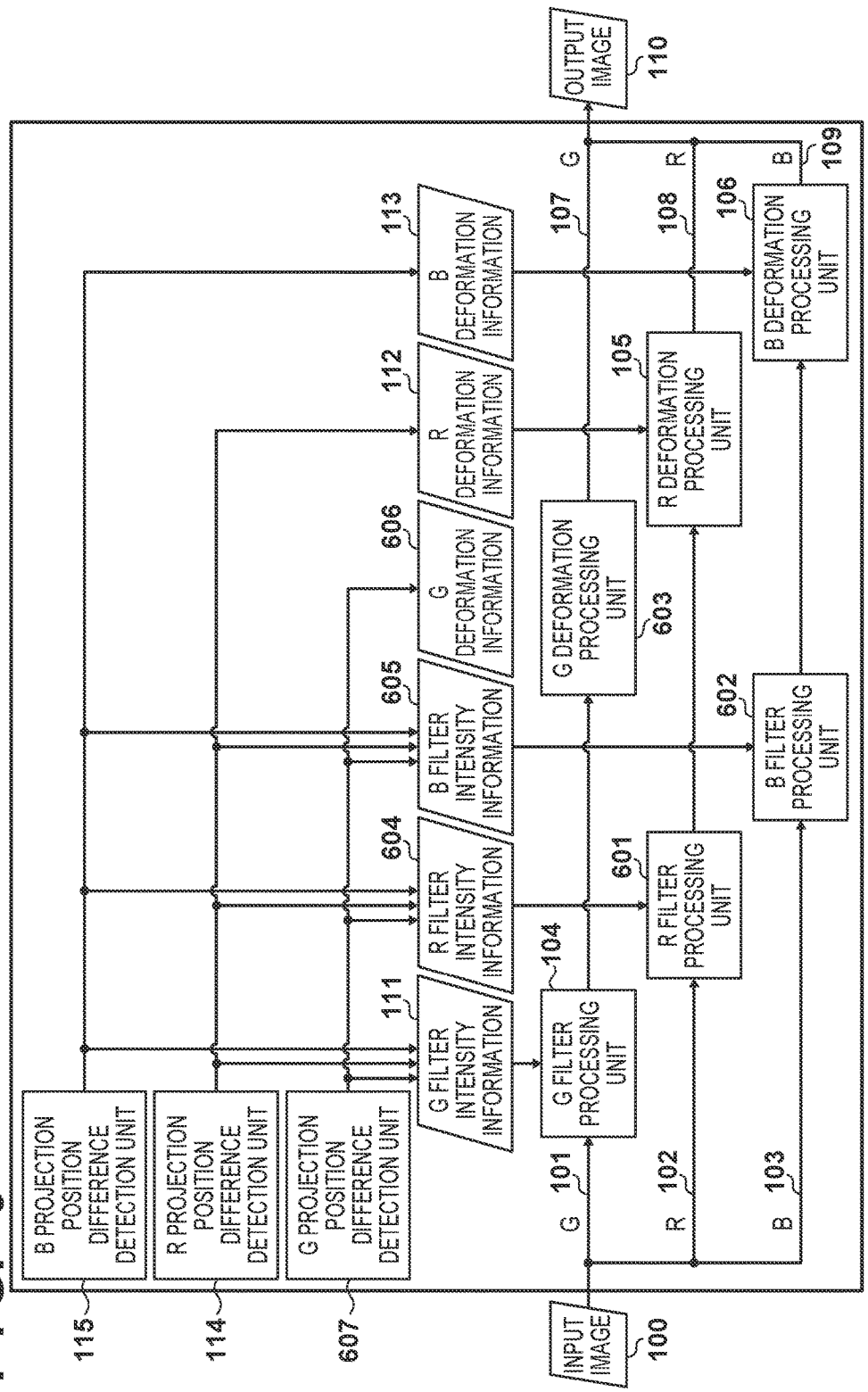
FIG. 6 is a block diagram showing the arrangement of a projection apparatus according to the second embodiment.

FIG. 6 is a block diagram showing the arrangement of a projection apparatus according to the second embodiment. The same reference numerals as in the first embodiment denote the same functional units, and a description thereof will be omitted.

A G projection position difference detection unit 607 detects a pixel position deviation amount between a predetermined position on a predetermined projection plane and the projected image of the G image. The predetermined position is, for example, a specific position (for example, a corner of a screen) used to align the projection positions of the color components. A G deformation processing unit 603 calculates G deformation information 606 based on the pixel position deviation amount detected by the G projection position difference detection unit 607, and performs deformation processing. The same processing as that for the G image is performed for the R and B images, and a description thereof will be omitted.

An R filter processing unit 601 performs filter processing for an R input image 102 based on R filter intensity information 604, and outputs the result to an R deformation processing unit 105. A B filter processing unit 602 performs filter processing for a B input image 103 based on B filter intensity information 605, and outputs the result to a B deformation processing unit 106.

R/G/B filter intensity information is decided by input of the pixel position deviation amount of each color component. A description will be made below using the G image as an example. Filter intensity information is decided similarly for the R and B images as well.

G filter intensity information 111 is decided for a pixel for which the pixel position deviation amount in the G image is zero (absent) by referring to the pixel position deviation amount of the R image and the pixel position deviation amount of the B image. A detailed deciding method is the same as that described in the first embodiment. In the G image, if a pixel position deviation amount less than one pixel is generated, filter processing may be disabled. However, the apparatus is preferably configured to change the filter intensity in accordance with the pixel position deviation amount of the G image. For example, for a vertical pixel position deviation amount (−δy) in the G image, let δdy be the absolute value of the decimal fraction. Then, $0.0 \leq \delta dy < 1.0$. At this time, an intensity to disable filter processing as δdy becomes close to 1.0 is preferably set. For example, adjustment is preferably performed such that when δdy is 0.5 or more, filter processing is disabled, and when $0.0 \leq \delta dy < 0.5$, the filter intensity is linearly changed.

Note that in general, if deformation processing is performed, aliasing distortion of the signal may occur and may be visually perceivable as a moiré depending on the pattern of the input image. To suppress the moiré, smoothing processing using a low-pass filter is preferably performed for the input image. For example, smoothing processing for suppressing the moiré can be performed using the R/G/B filter processing unit.

<Operation of Apparatus>

Figure 7:
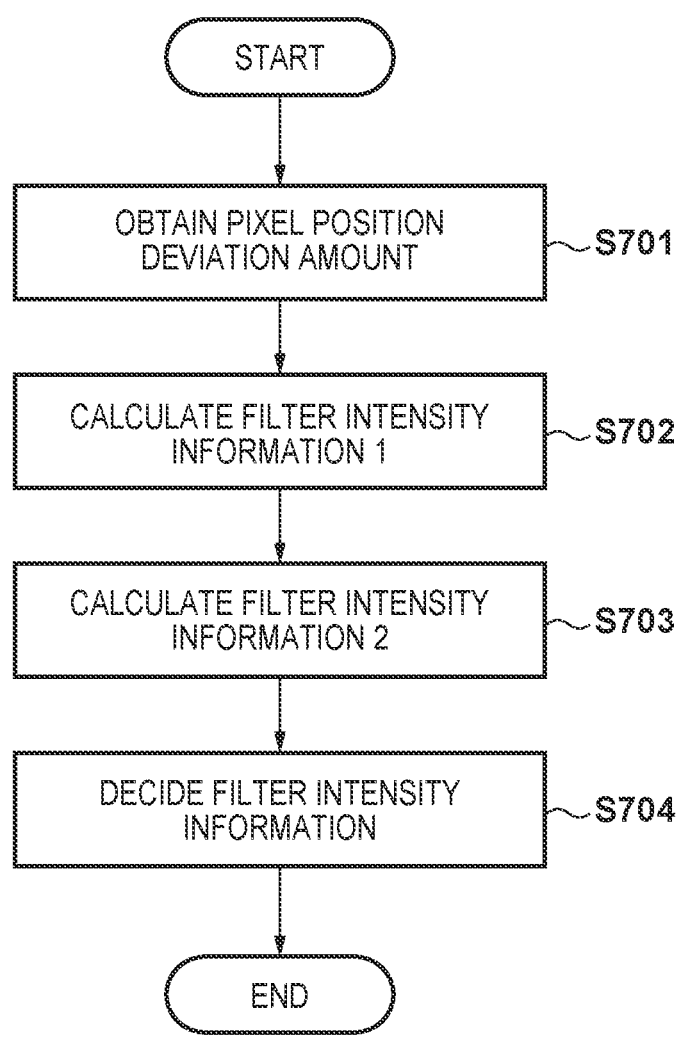
FIG. 7 is a flowchart showing the operation of the projection apparatus according to the second embodiment.

FIG. 7 is a flowchart showing the operation of the projection apparatus according to the second embodiment. Note that deformation processing is the same as in the first embodiment, and only a portion associated with calculation of a filter intensity (corresponding to (steps S504 and S505) in FIG. 5) will be described here.

In step S701, an R projection position difference detection unit 114, a B projection position difference detection unit 115, and the G projection position difference detection unit 607 obtain the pixel position deviation amounts of the color component images (R, G, and B images) with respect to a predetermined position on the projection plane.

In step S702, filter intensity information 1 is calculated based on the pixel position deviation amount of the color component of the deformation target of the obtained pixel position deviation amounts. Filter intensity information 1 is a filter intensity to be referred to in smoothing processing for suppressing moiré that can be generated by deformation processing.

When performing interpolation calculation processing of a pixel by deformation processing, smoothing processing is performed for an input pixel that is referred to in interpolation calculation processing. A predetermined filter coefficient may be turned on/off depending on the presence/absence of interpolation calculation processing. Alternatively, the intensity of filter processing may be changed in accordance with the interpolation distance, that is, the pixel position deviation amount or the absolute value of the decimal fraction of the pixel position deviation amount at the time of the interpolation calculation.

In step S703, a G filter processing unit 104, the R filter processing unit 601, and the B filter processing unit 602 calculate filter intensity information 2 based on the pixel position deviation amount of the color component of the deformation target of the obtained pixel position deviation amounts. As described in the first embodiment, filter intensity information 2 is a filter intensity to be referred to in smoothing processing for suppressing a change in color/tint caused by pixel position deviation adjustment.

In step S704, the G filter processing unit 104, the R filter processing unit 601, and the B filter processing unit 602 decide filter intensity information to be applied to filter processing from filter intensity information 1 and filter intensity information 2. For example, the maximum value of filter intensity information 1 and filter intensity information 2 is selected and applied.

As described above, according to the second embodiment, the pixel position deviation of each color component image with respect to the reference position on the projection plane is detected. A filter intensity in smoothing processing is decided based on the pixel position deviation amount of each color component image. This makes it possible to simultaneously implement reduction of the pixel position deviation and suppressing of the change in color/tint. In particular, the change in color/tint can suitably be suppressed by changing the filter intensity in accordance with the degree of pixel position deviation adjustment of the remaining color component images. It is also possible to implement suppressing of moiré that can be generated by deformation processing.

Third Embodiment

In the third embodiment, a form in which instead of performing smoothing processing using a spatial filter, smoothing processing by interpolation calculation is executed in deformation processing will be described.

<Arrangement of Apparatus>

Figure 8:
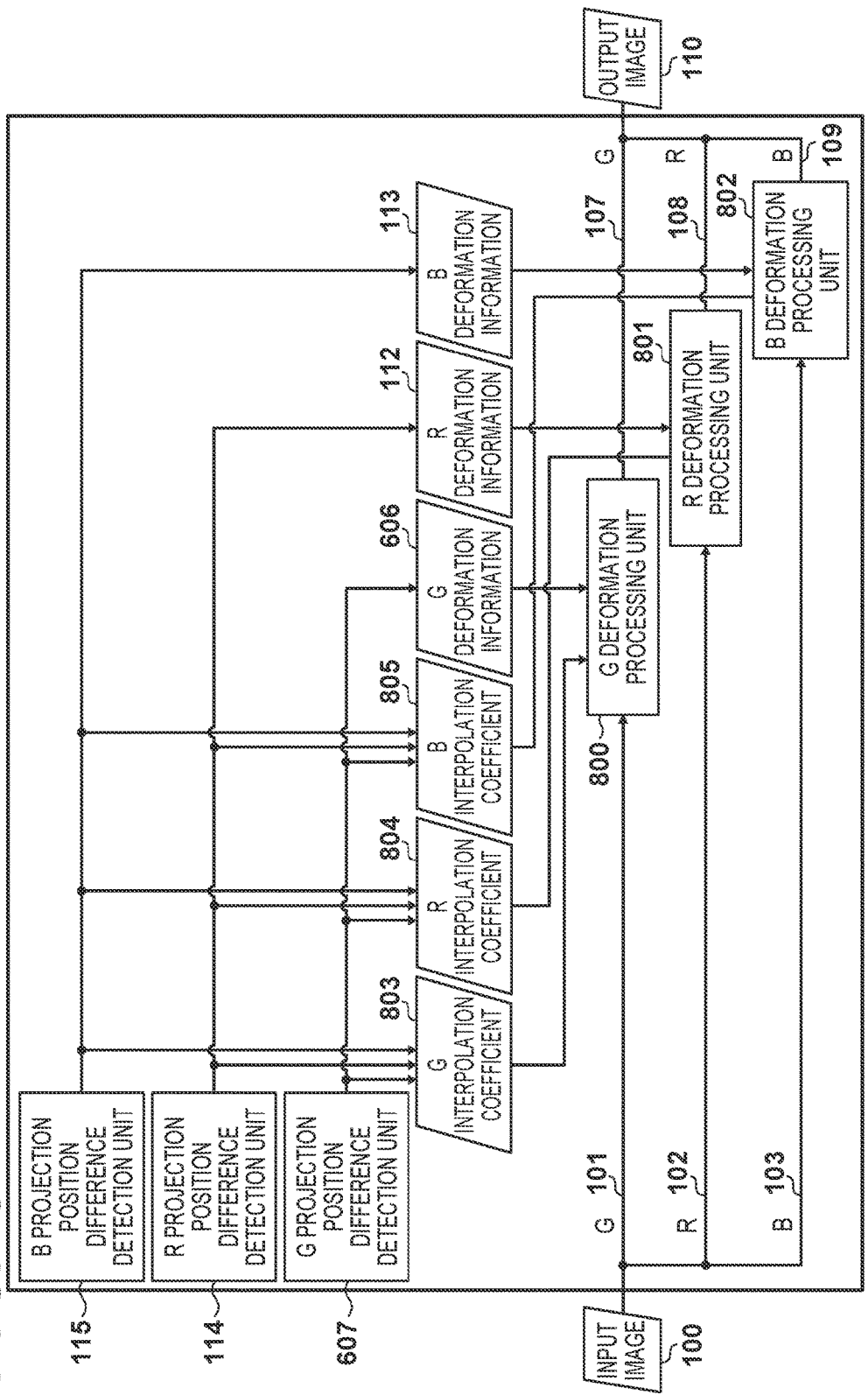
FIG. 8 is a block diagram showing the arrangement of a projection apparatus according to the third embodiment.

FIG. 8 is a block diagram showing the arrangement of a projection apparatus according to the third embodiment. The same reference numerals as in the second embodiment denote the same functional units, and a description thereof will be omitted.

A G deformation processing unit 800, an R deformation processing unit 801, and a B deformation processing unit 802 perform interpolation calculation processing for color component images together with the above-described deformation processing. Here, general piecewise linear compensation is assumed, and the slope of each section is changed in accordance with a coefficient, thereby changing a frequency characteristic. The coefficient is calculated based on the pixel position deviation amount in at least one of remaining color component images, as in the above-described embodiment. That is, a coefficient to perform smoothing processing of a target image to be superimposed on the projection plane is calculated.

As described above, according to the third embodiment, the pixel position deviation of each color component image with respect to the reference position on the projection plane is detected. The interpolation coefficient of piecewise linear compensation is changed based on the pixel position deviation amount of each color component image. This makes it possible to simultaneously implement reduction of the pixel position deviation and suppressing of the change in color/tint.

(Modification)

In the above-described embodiments, a form in which a plurality of color component images are projected by one image projection apparatus has been described. However, the embodiments can also be applied to an image projection system using a plurality of image projection apparatuses such as multi-projection or stack projection. For example, the embodiments can also be applied to a form in which in an image projection system including an image projection apparatus A and an image projection apparatus B, partial regions or whole regions of two projected images are superimposed and displayed on the projection plane. That is, when performing pixel position deviation adjustment at an accuracy less than one pixel and aligning the projection positions of two images, the same processing as described above is performed using, for example, an image projected by the image projection apparatus A as a reference image and an image projected by the image projection apparatus B as a remaining image. This makes it possible to adjust the pixel position deviation in the superimposed image and suppress image quality degradation such as a change in color/tint. Note that the system may be configured to perform pixel position deviation adjustment of the superimposed image between the plurality of image projection apparatuses after pixel position deviation adjustment of each color component is performed in each image projection apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-033726, filed Feb. 24, 2017 which is hereby incorporated by reference herein in its entirety.

What is claimed is:

1. A projection apparatus comprising:
    a projection unit configured to project a plurality of color component images based on an input image onto a projection surface;
    an obtaining unit configured to obtain, concerning the plurality of color component images projected onto the projection surface, position information concerning a projection position of each of remaining color component images with reference to a projection position of one color component image; and
    an image processing unit configured to perform image processing for at least one of the plurality of color component images based on the position information obtained by the obtaining unit.

2. The apparatus according to claim 1, wherein the image processing unit performs smoothing processing for the color component image serving as the reference and performs deformation processing for each of the remaining color component images.

3. The apparatus according to claim 2, wherein a filter coefficient in the smoothing processing for the color component image serving as the reference is decided based on the position information concerning the remaining color component images, and
    a deformation parameter in the deformation processing for each of the remaining color component images is decided based on the position information of each of the remaining color component images.

4. The apparatus according to claim 1, further comprising an accepting unit configured to accept a user input,
    wherein the obtaining unit obtains the position information via the accepting unit.

5. The apparatus according to claim 1, further comprising a capturing unit configured to capture the plurality of color component images projected onto the projection surface,
    wherein the obtaining unit obtains the position information based on a captured image obtained by the capturing unit.

6. The apparatus according to claim 1, wherein the obtaining unit obtains the position information at an accuracy less than one pixel of the color component image.

7. A control method of a projection apparatus, comprising:
    projecting a plurality of color component images based on an input image onto a projection surface;
    obtaining, concerning the plurality of color component images projected onto the projection surface, position information concerning a projection position of each of remaining color component images with reference to a projection position of one color component image;
    performing image processing for at least one of the plurality of color component images based on the position information obtained in the obtaining; and
    projecting the plurality of color component images that have undergone the image processing in the performing the image processing onto the projection surface.

8. A non-transitory computer-readable recording medium storing a program that causes a computer having a projection unit to function as a projection apparatus comprising:
    a control unit configured to control the projection unit so as to project a plurality of color component images based on an input image onto a projection surface;
    an obtaining unit configured to obtain, concerning the plurality of color component images projected onto the projection surface, position information concerning a projection position of each of remaining color component images with reference to a projection position of one color component image; and
    an image processing unit configured to perform image processing for at least one of the plurality of color component images based on the position information obtained by the obtaining unit.

* * * * *